United States Patent [19]

Arai

[11] Patent Number: 4,583,129
[45] Date of Patent: Apr. 15, 1986

[54] COLOR TV SIGNAL PLAYBACK APPARATUS

[75] Inventor: Koji Arai, Tokyo, Japan
[73] Assignee: Victor Company of Japan, Limited, Kanagawa, Japan
[21] Appl. No.: 560,764
[22] Filed: Dec. 12, 1983
[30] Foreign Application Priority Data
  Dec. 14, 1982 [JP] Japan .............................. 57-218862
[51] Int. Cl.$^4$ .............................................. H04N 9/89
[52] U.S. Cl. ................................................... 358/320
[58] Field of Search ................. 358/320, 324, 325, 326
[56] References Cited
  U.S. PATENT DOCUMENTS
  4,330,791  5/1982  Ohara et al. ........................ 358/320

Primary Examiner—Donald McElheny, Jr.
Attorney, Agent, or Firm—Jordan and Hamburg

[57] ABSTRACT

A color TV signal playback apparatus capable of applying H (horizontal sync) period compensation and color sequence compensation to a color TV signal stored in a magnetic tape. A 1-H delayed reproduced color signal and a non-delayed reproduced color signal are switched from one to the other in response to a color sequence compensating signal. The selected reproduced color signal is multiplexed with a reproduced luminance signal to prepare a composite video signal. A signal produced by delaying the composite video signal by a period of time equal to a deviation in the period of a horizontal sync signal and the non-delayed composite video signal are selected in response to an H-period compensating signal, thereby producing a compensated color TV signal.

4 Claims, 6 Drawing Figures

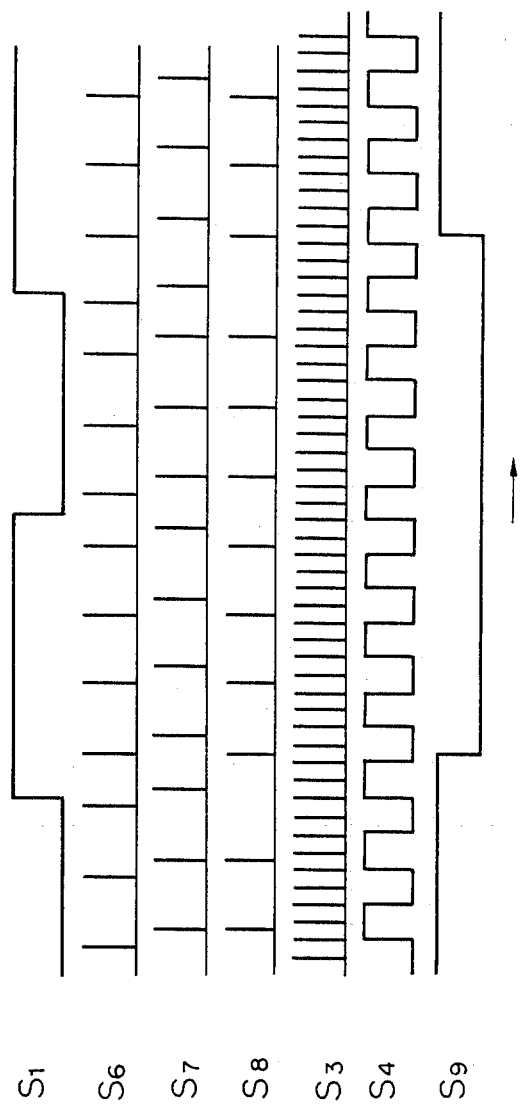

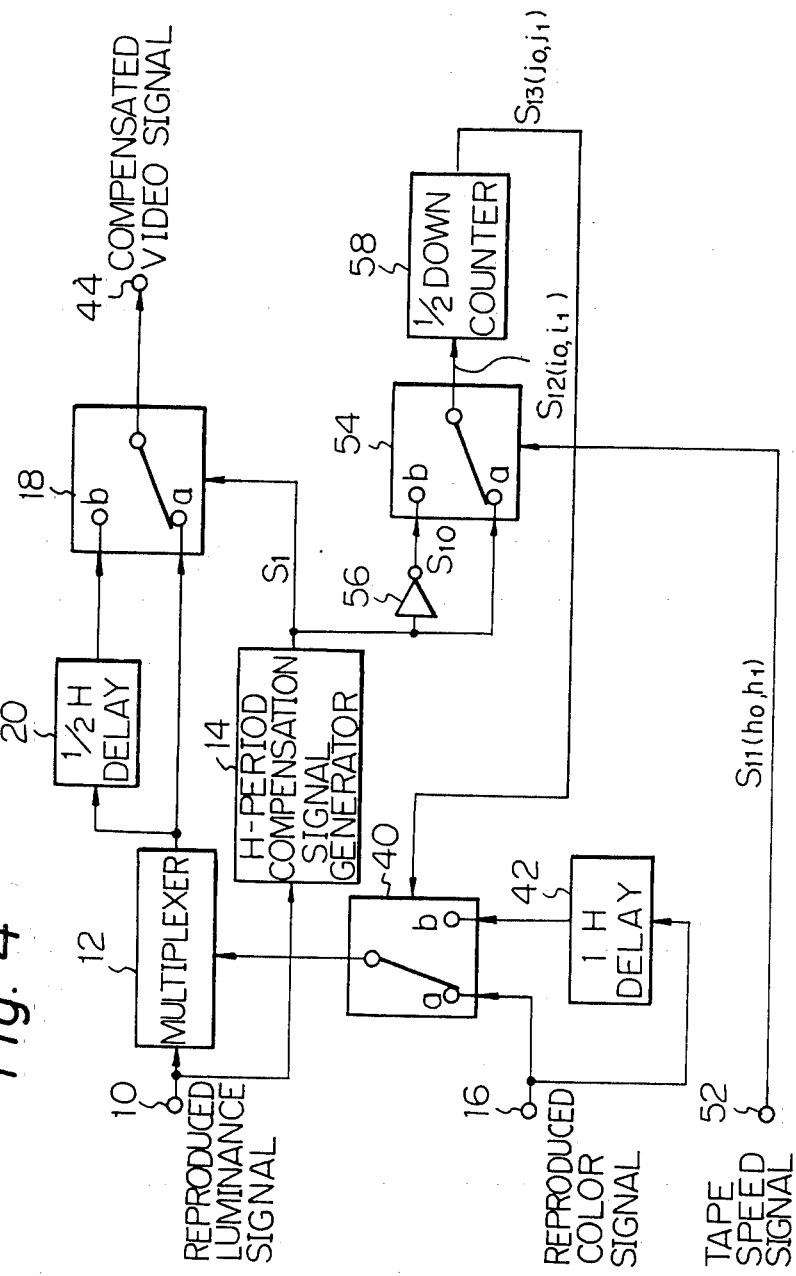

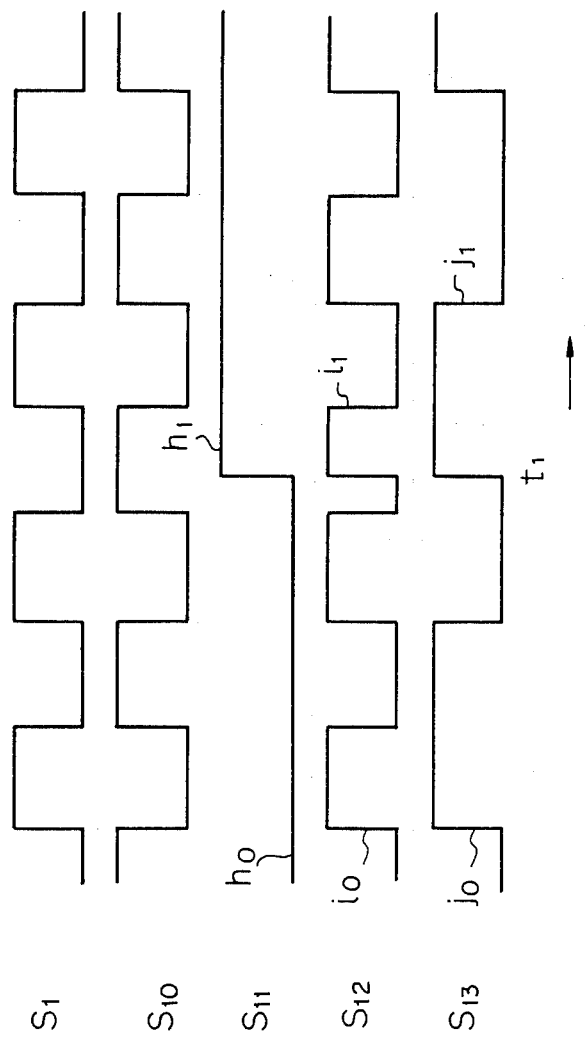

4,583,129

COLOR TV SIGNAL PLAYBACK APPARATUS

BACKGROUND OF THE INVENTION

The present invention relates to a color television (TV) signal playback apparatus which plays back a color TV signal out of a magnetic tape by a magnetic head while readily compensating the phase of a reproduced color signal and the period of a horizontal sync signal.

When a color TV signal is recorded into a magnetic tape, horizontal sync signals in adjacent tracks are sometimes misaligned with each other. Should such a magnetic tape be transported to play back at a speed different from a recording speed (variable speed playback) or in the opposite direction to a recording direction for presenting backward picture motion, the TV signal picked up by the head might have a horizontal sync signal period deviating from the normal value, i.e. 1 H (one horizontal sync). The deviation has to be compensated for during playback in order to attain the normal period. Such compensation will hereinafter be referred to as "horizontal sync signal period compensation" or "H-period compensation".

Concerning a color TV signal in accordance with the phase-alternation line (PAL) system, when it is played back after being recorded in the above-described condition, the reproduced picture will lose colors because the phase of the color burst signal in the color TV signal fails to match with a phase prescribed by the standards. Therefore, during playback, it is necessary to compensate color signal phases such that the color burst phases are in a predetermined order. This compensation will hereinafter be called the "color sequence compensation" for convenience.

Some color TV signal playback apparatuses are known in the art which feature the above-described H-period compensation and color sequence compensation capabilities. However, because all the prior art apparatuses of the kind concerned are designed to demultiplex a luminance signal and a color signal after H-period compensation, subject the color signal to color sequence compensation, and then multiplex the color and luminance signals again, various circuit elements such as a burst gate pulse generator, a multiplexer, a burst phase detector, a VXO and a demultiplexer are required in addition to a circuit usually installed in a magnetic recording and playback apparatus for producing a burst phase detection output. Therefore, the entire circuit construction is intricate and bulky.

SUMMARY OF THE INVENTION

It is an object of the present invention to provide an economical, compact and simple color TV signal playback apparatus which is capable of readily performing period compensation for a horizontal sync signal and color sequence compensation.

It is another object of the present invention to provide a color TV signal playback apparatus which is capable of readily and surely compensating the period of a horizontal sync signal and a color sequence when a magnetic tape is driven in a playback mode slower than in a recording mode or the tape transporting direction is opposite to the recording direction.

It is another object of the present invention to provide a generally improved color TV signal playback apparatus.

A color TV signal playback apparatus for playing back a color TV signal recorded in a magnetic tape of the present invention comprises a first delay circuit for delaying an incoming reproduced color signal by 1 H to generate a 1-H delayed reproduced color signal, a color sequence compensating signal generator for generating a color sequence compensating signal to compensate a phase of the reproduced color signal, a first switch for switching the reproduced color signal and the 1-H delayed reproduced color signal from one to the other in response to the color sequence compensating signal, thereby producing a switched reproduced color signal, a multiplexer for multiplexing the switched reproduced color signal and an incoming reproduced luminance signal to produce a composite video signal, a second delay circuit for delaying the composite video signal by a period of time equal to an amount of deviation in a period of a horizontal sync signal which develops when a playback operation occurs at a speed different from a recording speed, thereby producing a delayed composite video signal, an H-period compensating signal generator for generating an H-period compensating signal in response to a timing at which the deviation occurs in the period of the horizontal sync signal, and a second switch for switching the composite video signal and the delayed composite video signal from one to the other in response to the H-period compensating signal, thereby producing a compensated color TV signal.

In accordance with the present invention, a color TV signal playback apparatus is capable of applying H-period compensation and color sequence compensation to a color TV signal stored in a magnetic tape. A 1-H delayed reproduced color signal and a non-delayed reproduced color signal are switched from one to the other in response to a color sequence compensating signal. The selected reproduced color signal is multiplexed with a reproduced luminance signal to prepare a composite video signal. A signal produced by delaying the composite video signal by a period of time equal to a deviation in the period of a horizontal sync signal and the non-delayed composite video signal are selected in response to an H-period compensating signal, thereby producing a compensated color TV signal.

The above and other objects, features and advantages of the present invention will become apparent from the following detailed description taken with the accompanying drawings.

BRIEF DESCRIPTION OF THE DRAWINGS

FIG. 3 is a waveform diagram representing the operation of the apparatus shown in FIG. 2;

FIG. 4 is a block diagram showing another embodiment of the present invention; and FIG. 5 is a waveform diagram representing the operation of the apparatus shown in FIG. 4.

DESCRIPTION OF THE PREFERRED EMBODIMENTS

While the color TV signal playback apparatus of the present invention is susceptible of numerous physical embodiments, depending upon the environment and requirements of use, substantial numbers of the herein shown and described embodiments have been made, tested and used, and all have performed in an eminently satisfactory manner.

Before entering into detailed discussion of the present invention, a brief reference will be made to a prior art color signal playback apparatus furnished with the H-period compensation and color sequence compensation functions, illustrated in FIG. 1.

Figure 1A:
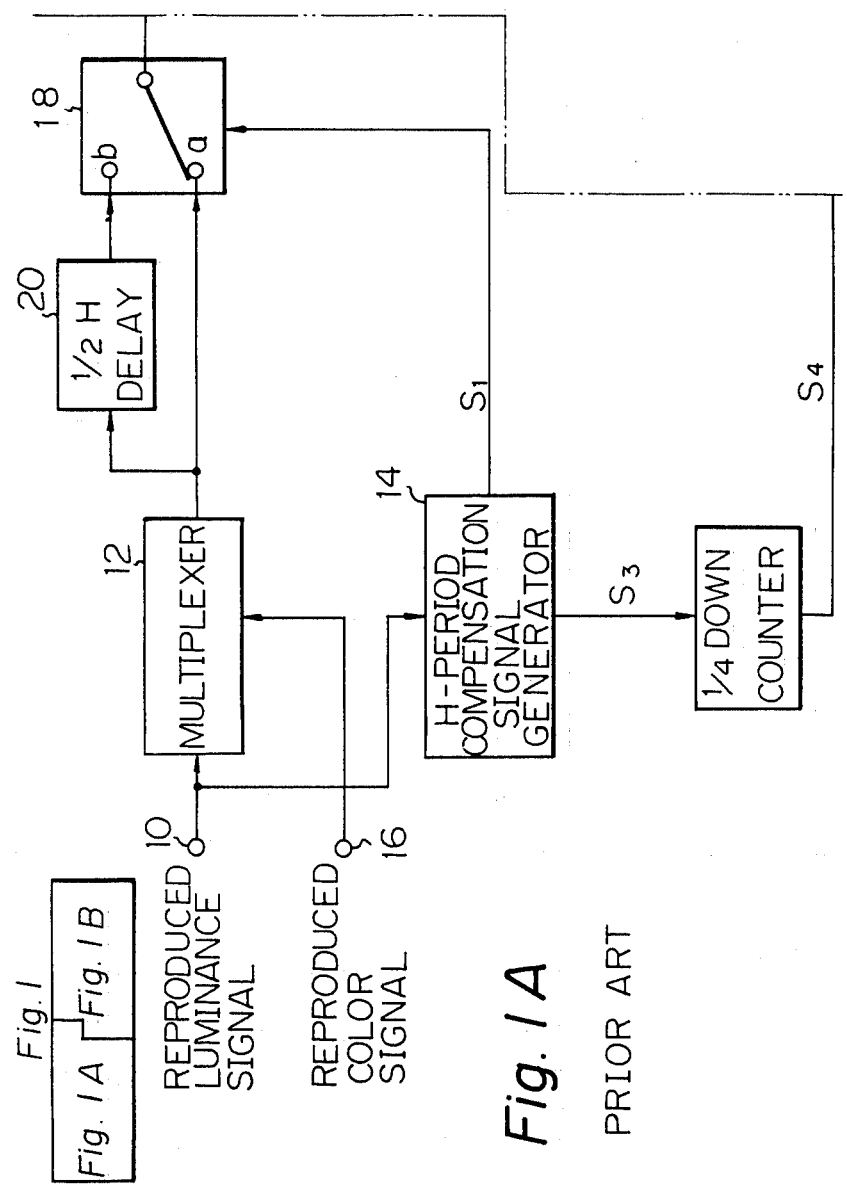
FIG. 1 (comprising FIGS. 1A and 1B) is a block diagram showing an example of prior art color TV signal playback apparatuses each having a function of compensating the period of a horizontal sync signal of a color TV signal and a function of compensating color sequence.
Figure 1B:
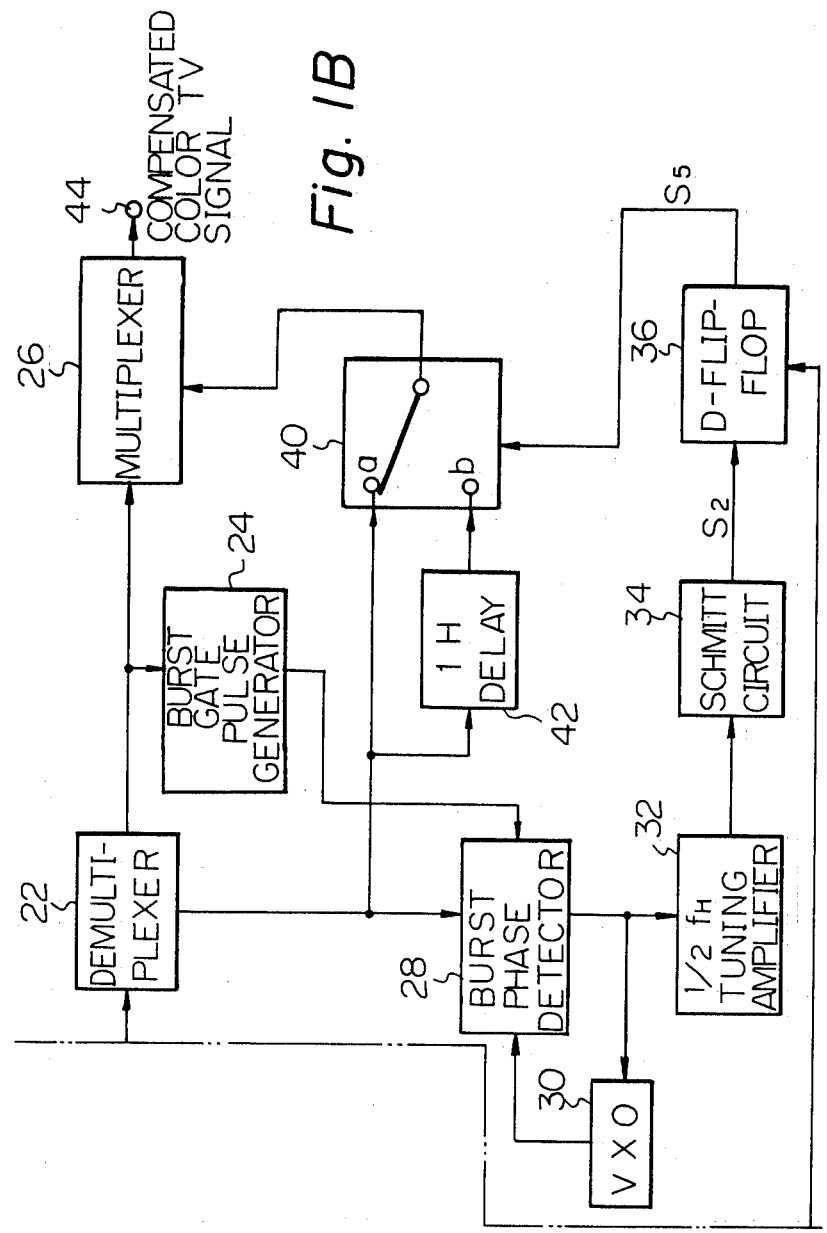

In FIG. 1, a reproduced luminance signal arrives at a terminal 10 and fed therefrom to a luminance/color signal multiplexer 12 and an H-period compensating signal generator 14. Also supplied to the multiplexer 12 is a reproduced color signal which arrives at a terminal 16. The H-period compensating signal generator 14 is constructed to generate an H-period compensating signal $S_1$ which, when the period of the horizontal sync signal of the reproduced luminance signal has undergone a deviation of $\frac{1}{2}$ H, for example, varies its level from "H" to "L" or from "L" to "H" at the moment of the deviation (essentially, the instant when a magnetic head has traced obliquely from one track to another). The signal $S_1$ is fed to a switch 18 to shift a movable contact thereof to a terminal a or b. The color TV signal output from the multiplexer 12 is applied to the terminal b of the switch 18 via a $\frac{1}{2}$ H delay circuit 20, which is adapted to delay the input by $\frac{1}{2}$ H which is equal to the above-mentioned deviation. The delayed multiplexer output and the non-delayed multiplexer output, which is directly fed to the terminal a of the switch 18, are switched from one to the other by the H-period compensating signal $S_1$. That is, if the reproduced signal is deviated $\frac{1}{2}$ H, it will be picked up after being converted into a $\frac{1}{2}$ H delayed signal by the H-period compensating signal $S_1$ (after being H-period compensated to the normal 1 H).

The H-period compensated signal output from the switch 18 is routed to a luminance/color signal demultiplexer circuit 22 to be thereby separated into the color signal and the luminance signal. The luminance signal is applied to a burst gate pulse generator 24 and a luminance/color signal multiplexer 26. The burst gate pulse generator 24 is constructed to detect a horizontal sync signal in the luminance signal so as to deliver gate pulses at a timing corresponding to color bursts. The gate pulses are supplied to a burst phase detector 28.

The color signal separated by the demultiplexer 22 is routed to the burst phase detector 28 in which the color bursts are gated by the gate pulses. By an output oscillation frequency control over a VXO 30, a voltage corresponding to the phase of a color burst is produced from the burst phase detector 28 and applied to an amplifier 32 for tuning to $\frac{1}{2}$ $f_H$ ($f_H$ representing the frequency of the horizontal sync signal). Generally, the reproduced color burst phase detection output has a period of $\frac{1}{2}$ $f_H$. The reproduced burst phase detection output with a $\frac{1}{2}$ $f_H$ component thereof amplified by the amplifier 32 is fed to a Schmitt circuit 34 to be converted thereby into a pulse signal $S_2$ having a short duration and synchronous with the buildup of the detection output. The signal $S_2$ is delivered from the Schmitt circuit 34 to a clock input terminal of a D-type flip-flop 36.

The H-period compensating signal generator 14, on the other hand, has a 2-$f_H$ VCO which is phase-locked to the horizontal sync singal of the input. The VCO output is fed to a $\frac{1}{4}$ downcounter 38 the output of which is in turn delivered to the D input terminal of the D-type flip-flop 36. The flip-flop 36 prepares a color sequence compensating signal $S_5$ from the pulse signal $S_2$ corresponding to the timing of the H-period compensated burst phase detection output and a signal $S_4$ corresponding to the timing of the H-period non-compensated horizontal sync signal. The color sequence compensating signal $S_5$ is fed to a switch 40.

The color signal from the demultiplexer 22 is routed to a terminal a of the switch 40 and, via a 1-H delay circuit 42, to a terminal b. The delayed and non-delayed demultiplexer outputs are selectively fed to the multiplexer 26 by the color sequence compensating signal $S_5$. The multiplexer 26 multiplexes the H-period and color sequence compensated color signal output from the switch 40 and the H-period compensated luminance signal output from the demultiplexer 22. The output of the multiplexer 26 is picked up as a compensated color TV signal at an output terminal 44.

In the manner described above, the prior art color TV signal playback apparatus separates a luminance signal and a color signal from each other after H-period compensation, subjects the color signal to color sequence compensation, and recombines the color signal and luminance signal. Such a construction requires, in addition to a circuitry usually installed in a magnetic recording and playback apparatus for producing a burst phase detection output, the burst gate pulse generator 24, multiplexer 26, burst phase detector 28, and VXO 30 as well as the demultiplexer 22 as shown in FIG. 1. As such, the circuit arrangement cannot be simplified and is unavoidably bulky.

Figure 2:
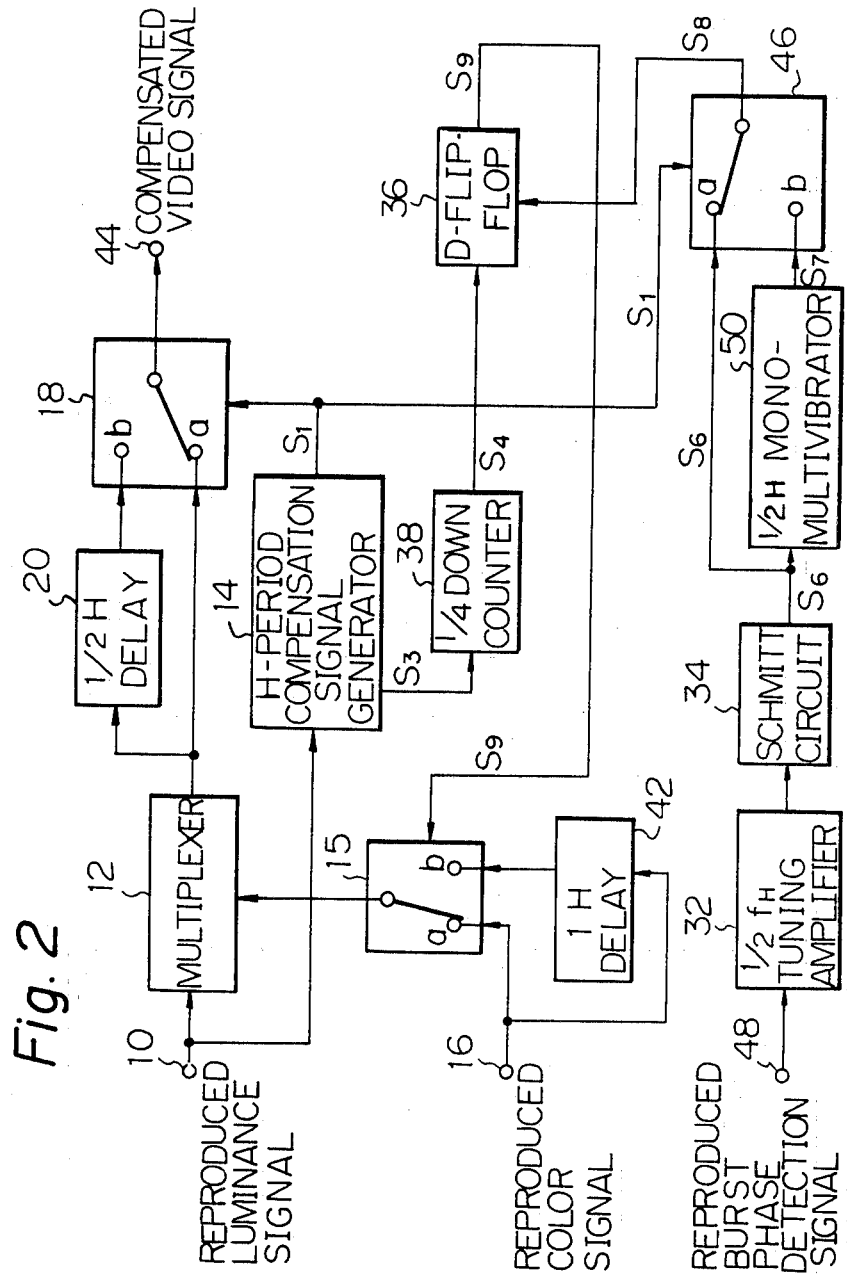
FIG. 2 is a block diagram of a color TV signal playback apparatus embodying the present invention.

Referring to FIG. 2, a color TV signal playback apparatus embodying the present invention is shown which eliminates the drawbacks discussed above. In FIG. 2, the same structural elements as those shown in FIG. 1 are designated by the same reference numerals and description thereof will be omitted for simplicity.

In FIG. 2, the H-period compensating signal $S_1$ output from the H-period compensating signal generator 14 and having a waveform shown in FIG. 3, for example, is applied to the switch 18 and a switch 46 to simultaneously shift their movable contacts into connection with those terminals which are designated by the same alphabets. Meanwhile, the reproduced color signal coming in through the terminal 16 is routed to the terminal a of a switch 15 and, at the same time, to the terminal b of the switch 15 after being delayed 1 H by the 1-H delay circuit 42.

Arriving at a terminal 48 is a reproduced burst phase detection output which is produced from a circuit usually built in a magnetic recording and playback apparatus. The reproduced burst phase detection output is applied to the $\frac{1}{2}$ $f_H$ tuning amplifier 32 to have the $\frac{1}{2}$ $f_H$ component thereof amplified. The amplifier output is applied to the Schmitt circuit 34 which then processes the amplifier output into a pulse signal $S_6$ having a short duration as shown in FIG. 3. The pulse signal $S_6$ is delivered to a $\frac{1}{2}$ H monostable multivibrator 50 and a terminal a of the switch 46.

The signal $S_6$ fed to the $\frac{1}{2}$ H monostable multivibrator 50 is delayed $\frac{1}{2}$ H to appear as a signal $S_7$ shown in FIG. 3. Applied to a terminal b of the switch 46, the signal $S_7$ is selected by the H-period compensating signal $S_1$ in place of the signal $S_6$ which is directly supplied from the Schmitt circuit 34 to the terminal a of the switch 46. The switch 46 produces a signal $S_8$ shown in FIG. 3 in response to the signal $S_1$. In effect, the signal $S_8$ may be regarded as a burst phase detection output which has undergone H-period compensation, amplification and shaping. The output $S_8$ of the switch 46 is supplied to the clock input terminal of the D-type flip-flop 36.

The output of the VCO of the H-period compensating signal generator 14, i.e., the 2 $f_H$ signal $S_3$ shown in FIG. 3, is divided to ½ by the ½ downcounter 38 to appear as the signal $S_4$ also shown in FIG. 3. The signal $S_4$ is routed to the D input terminal of the D-type flip-flop 36. The flip-flop 36 prepares a color sequence compensating signal $S_9$ as shown in FIG. 3 by processing the signal $S_8$, which corresponds to the timing of the essentially H-period compensated burst phase detection output, and the signal $S_4$, which corresponds to the timing of the H-period non-compensated horizontal sync signal. The color sequence compensating signal $S_9$ is applied to the switch 15.

The reproduced color signal arriving at the terminal a of the switch 15 and the 1-H delayed color signal arriving at the terminal b are selectively passed through the switch 15 by the color sequence compensating signal $S_9$. The output of the switch 15 is fed to the multiplexer 12 to be combined with the reproduced luminance signal which comes in through the terminal 10. The output of the multiplexer 12 is a combination of the color sequence compensated color signal and the H-period non-compensated luminance signal. Such a composite signal is directly fed to the terminal a of the switch 18 and, via the ½ delay 20, to the terminal b. From the switch 18, the signal applied to the terminal a and the signal applied to the terminal b are selectively delivered in response to the H-period compensating signal $S_1$. This switch output is produced as an H-period and color sequence compensated video signal from the terminal 44.

As described above, the color TV signal playback apparatus shown in FIG. 2 color-sequence compensates a reproduced color signal with a color sequence compensating signal which is prepared by use of an H-period compensated burst phase detection output, multiplexes the color-sequence compensated signal again with a reproduced luminance signal, and then picks up the composite signal after H-period compensation. Hence, compared to the prior art circuitry constructed to perform color-sequence compensation after demultiplexing an H-period compensated video signal into a luminance signal and a color signal, the circuitry in accordance with the described embodiment is far simpler in construction due to the omission of the demultiplexer, burst gate pulse generator, burst phase detector, VXO, multiplexer, and the like.

Referring to FIG. 4, a second embodiment of the present invention is shown. In FIG. 4, the same structural elements as those shown in FIGS. 1 and 2 are designated by the same reference numerals and description thereof will be omitted.

The playback apparatus shown in FIG. 4 includes an input terminal 52 for a signal indicative of an instantaneous tape speed during playback. The tape speed signal is "L" level when the tape transport direction is the same as the recording direction and the tape speed is higher than the recording speed (e.g. in a search mode), while being "H" level in the other modes of operation (e.g. slow picture motion playback and reverse picture motion playback modes). When a color TV signal is played back at a tape speed different from a recording speed, the H-period compensating signal $S_1$ in FIG. 5 is produced and applied to a terminal a of a switch 54. At the same time, the signal $S_1$ is phase-inverted by an inverter 56 to become a signal $S_{10}$ shown in FIG. 5, the signal $S_{10}$ being supplied to a terminal b of the switch 54.

Where the tape runs in a playback mode in the same direction as in a recording mode and faster than in the latter mode, "L" level part $h_0$ of a detection signal $S_{11}$ shown in FIG. 5 arrives at the terminal 52 to be fed to the switch 54. This maintains the switch 54 connected to the terminal a so that part $i_0$ of a signal $S_{12}$ shown in FIG. 5 and identical with the H-period compensating signal $S_1$ is produced from the switch 54. The signal component $i_0$ is downcounted to ½ by a ½ downcounter 58 to become a color-sequence compensating signal component $j_0$ of a signal $S_{13}$ shown in FIG. 5.

In this particular embodiment, a reproduced burst phase detection output is not used and, instead, the signal produced by downcounting the H-period compensating signal $S_1$ to ½ is used as a color sequence compensating signal. This shares the same principle as the color sequence compensating signal $S_9$ in the embodiment of FIGS. 2 and 3 which is produced by downcounting the H-period compensating signal $S_1$ to substantially ½.

The component $j_0$ of the color sequence compensating signal $S_{13}$ is supplied to the switch 40 so that the switch 40 selectively supplies to the multiplexer 12 the reproduced color signal and the 1-H delayed reproduced color signal. The operation to follow is common to the operation described with reference to FIGS. 2 and 3 and, therefore, will not be described any further.

When the tape is transported at a speed different from the recording speed and, from time $t_1$ in FIG. 5, at a speed lower than the recording speed or in the opposite direction, "H" level part $h_1$ of the signal $S_{11}$ shown in FIG. 5 arrives at the terminal 52. The signal component $h_1$ brings the switch 54 into connection with the terminal b whereby a component $i_1$ of the signal $S_{12}$ identical with the phase-inverted H-period compensating signal $S_{10}$ is produced. The signal $i_1$ is processed by a ½ downcounter 58 into a color sequence compensating signal $j_1$ of the signal $S_{13}$ shown in FIG. 5. That is, when the tape playback speed is lower than the tape recording speed or when the tape is transported in the opposite direction to the recording direction, the signal $S_{10}$ opposite in phase to the H-period compensating signal $S_1$ is downcounted ½ to prepare a color sequence compensating signal. The rest of the operation will be readily understood from the above description.

In summary, a color TV signal playback apparatus of the present invention is constructed to switch a 1 H delayed reproduced color signal and a non-delayed reproduced color signal from one to the other in response to a color sequence compensating signal, multiplex the switched reproduced color signal with a reproduced luminance signal to prepare a composite video signal, and selectively supply a signal produced by delaying the composite video signal by a period of time equal to a deviation in the period of a horizontal sync signal and the non-delayed composite video signal in response to an H-period compensating signal, thereby producing a compensated color TV signal. Therefore, in contrast to the prior art apparatus which H-period compensates a composite video signal prepared by multiplexing a reproduced luminance signal and a reproduced color signal, separates the luminance and color signals from each other, subjects the color signal to color sequence compensation, and then mixes them again, the apparatus of the present invention eliminates the need for a demultiplexer, a circuit for producing a color sequence compensating signal from a color signal separated by the separator, a multiplexer for remultiplexing the separated luminance and color signals, and like circuits. This significantly simplfies the construction and trims the dimensions and costs.

More concretely, the color sequence compensating signal is prepared by a first circuit which, in response to an H-period compensating signal, selectively picks up an output of a reproduced color burst phase detector installed in a color signal playback arrangement of a playback apparatus and a signal prepared by delaying the phase detector output by a period of time equal to the deviation, thereby producing a color burst phase detection output which has been essentially compensated with respect to the period of the horizontal sync signal, and a second circuit which obtains a color sequence compensating signal from a phase of the output of the first circuit and a phase of a signal prepared by dividing a signal which corresponds to the timing of the horizontal sync signal, which is produced from a reproduced luminance signal. Therefore, various circuit elements are omissible such as the demultiplexer, burst gate pulse generator, burst phase detector, VXO, multiplexer, and the like.

Furthermore, because the color sequence compensating signal is produced by dividing the H-period compensating signal to $\frac{1}{2}$, the circuit construction is additionally simplified. Also, the color sequence compensating signal is prepared by a circuit which selects the H-period compensating signal and a signal produce by phase-inverting the H-period compensating signal depending upon the situation in which the tape transport direction may be common to the tape recording direction and the tape speed may be faster than the recording speed, or the tape speed may be slower than the recording speed, or the tape transport direction is opposite to the recording direction, and a second circuit which divides an output signal of the first circuit to $\frac{1}{2}$. This insures H-period compensation and color sequence compensation even when the tape speed is lower than the recording speed or the tape transport direction is opposite to the reproducing direction.

Various modifications will become possible for those skilled in the art after receiving the teachings of the present disclosure without departing from the scope thereof.

What is claimed is:

1. A color television signal playback apparatus for playing back a color television signal recorded on a magnetic tape, said color television signal playback apparatus comprising:

first delay means for delaying an incoming reproduced color signal by 1 H to generate a 1-H delayed reproduced color signal;

color sequence compensating signal generator means for generating a color sequence compensating signal to compensate a phase of the reproduced color signal;

first switching means for switching the reproduced color signal and the 1-H delayed reproduced color signal from one to the other in response to the color sequence compensating signal, thereby producing a switched reproduced color signal;

multiplexer means for multiplexing the switched reproduced color signal and an incoming reproduced luminance signal to produce a composite video signal;

second delay means for delaying the composite video signal by a period of time equal to an amount of deviation in a period of a horizontal sync signal which develops when a playback operation occurs at a speed different from a recording speed, thereby producing a delayed composite video signal;

H-period compensating signal generator means for generating an H-period compensating signal in response to a timing at which said deviation occurs in the period of the horizontal sync signal; and second switching means for switching the composite video signal and the delayed composite video signal from one to the other in response to the H-period compensating signal, thereby producing a compensated color television signal, said color sequence compensating signal generator means comprising a third delay means for delaying an incoming reproduced color burst phase detection output signal by a period of time equal to the amount of deviation in the period of the horizontal sync signal, thereby producing a delayed color burst phase detection output signal, third switching means for switching the color burst phase detection output signal and the delayed color burst phase detection output signal from one to the other in response to the H-period compensating signal, thereby producing an H-period compensated color burst phase detection output signal, divider means for dividing a frequency of a signal corresponding to a timing of the horizontal sync signal produced from the reproduced luminance signal to produce a divided signal, and color sequence compensating signal output means for producing the color sequence compensating signal from a phase of the compensated color burst phase detection output and a phase of the divided signal.

2. A color television signal playback apparatus as claimed in claim 1, in which the third delay means comprises a $\frac{1}{2}$ H monostable multivibrator.

3. A color television signal playback apparatus as claimed in claim 1, in which the divider means comprises a $\frac{1}{4}$ downcounter.

4. A color television signal playback apparatus as claimed in claim 1, in which the color sequence compensating signal output means comprises a D-type flip-flop.

* * * * *